(12) United States Patent
Nikolov et al.

(10) Patent No.: US 8,967,492 B2
(45) Date of Patent: Mar. 3, 2015

(54) DROPLET GENERATION SYSTEM AND METHOD

(75) Inventors: Jonian Nikolov, Victoria (AU); Kok Seng Lim, Victoria (AU); Han Kwon Chang, Daejeon (KR); Hee Dong Jang, Daejeon (KR)

(73) Assignee: Commonwealth Scientific and Industrial Research Organisation (AU)

( * ) Notice: Subject to any disclaimer, the term of this patent is extended or adjusted under 35 U.S.C. 154(b) by 124 days.

(21) Appl. No.: 13/807,506

(22) PCT Filed: Jun. 30, 2011

(86) PCT No.: PCT/AU2011/000820
§ 371 (c)(1),
(2), (4) Date: Dec. 28, 2012

(87) PCT Pub. No.: WO2012/000049
PCT Pub. Date: Jan. 5, 2012

(65) Prior Publication Data
US 2013/0101500 A1    Apr. 25, 2013

(30) Foreign Application Priority Data
Jun. 30, 2010    (AU) ................. 2010902900

(51) Int. Cl.
*B05B 7/00*    (2006.01)
*C23C 4/00*    (2006.01)
(Continued)

(52) U.S. Cl.
CPC ............... *B01J 4/002* (2013.01); *B82Y 30/00* (2013.01); *C01B 13/34* (2013.01); *C01G 1/02* (2013.01);
(Continued)

(58) Field of Classification Search
None
See application file for complete search history.

(56) References Cited

U.S. PATENT DOCUMENTS 5,735,468 A * 4/1998 Casey .......................... 239/425
6,845,929 B2   1/2005 Dolatabadi et al.
(Continued)

FOREIGN PATENT DOCUMENTS

WO    2010037548    4/2010
WO    2010118480    10/2010

OTHER PUBLICATIONS

International Search Report for PCT/AU2011/000820, Completed by the Australian Patent Office on Aug. 18, 2011, 2 Pages.

*Primary Examiner* — Steven Bos
(74) *Attorney, Agent, or Firm* — Brooks Kushman P.C.

(57) ABSTRACT

A droplet generation system includes a first nozzle configuration structured to receive a liquid and a gas under pressure in a controllable feed ratio, and to merge the liquid and gas to form an intermediate stream that is a mixture of the gas and of a dispersed phase of the liquid. A second nozzle configuration is connected to receive the intermediate stream from the first nozzle configuration and has a valve mechanism with one or more controllable operating parameters to emit a stream of droplets of the liquid. The mean size of the droplets is dependent on the controllable feed ratio of the liquid and gas and the flow rate of the stream of droplets is dependent on the controllable operating parameter(s) of the valve mechanism. A corresponding method is disclosed, as is the application of the system and method to the production of nanoparticles in a thermochemical reactor.

30 Claims, 5 Drawing Sheets

(51) Int. Cl.
| | |
|---|---|
| B01J 4/00 | (2006.01) |
| B82Y 30/00 | (2011.01) |
| C01B 13/34 | (2006.01) |
| C01G 1/02 | (2006.01) |
| C01G 5/00 | (2006.01) |
| C01G 9/02 | (2006.01) |
| C01G 45/02 | (2006.01) |
| C01G 49/02 | (2006.01) |
| C01G 51/04 | (2006.01) |
| C01G 53/04 | (2006.01) |
| C04B 35/626 | (2006.01) |
| C23C 4/12 | (2006.01) |
| B01J 2/04 | (2006.01) |

(52) U.S. Cl.
CPC .. *C01G 5/00* (2013.01); *C01G 9/02* (2013.01); *C01G 45/02* (2013.01); *C01G 49/02* (2013.01); *C01G 51/04* (2013.01); *C01G 53/04* (2013.01); *C04B 35/62665* (2013.01); *C23C 4/121* (2013.01); *B01J 2/04* (2013.01); *C01P 2004/64* (2013.01); *C04B 2235/3203* (2013.01); *C04B 2235/3206* (2013.01); *C04B 2235/3217* (2013.01); *C04B 2235/3262* (2013.01); *C04B 2235/3272* (2013.01); *C04B 2235/3275* (2013.01); *C04B 2235/3279* (2013.01); *C04B 2235/3284* (2013.01); *C04B 2235/3291* (2013.01); *C04B 2235/443* (2013.01); *C04B 2235/5454* (2013.01); *Y10S 977/776* (2013.01)
USPC ............... 239/8; 239/311; 239/418; 239/423; 239/433; 239/424; 239/424.5; 239/425; 239/434.5; 423/604; 423/605; 423/622; 423/625; 423/632; 423/636; 423/641; 423/594.19; 977/776

(56) References Cited

U.S. PATENT DOCUMENTS

| | | | |
|---|---|---|---|
| 7,220,398 | B2 | 5/2007 | Sutorik et al. |
| 7,534,410 | B1 | 5/2009 | Chang et al. |
| 2007/0188553 | A1 | 8/2007 | Hiruma |
| 2012/0178972 | A1 | 7/2012 | Lim et al. |

* cited by examiner

DROPLET GENERATION SYSTEM AND METHOD

CROSS-REFERENCE TO RELATED APPLICATION

This application is the U.S. national phase of PCT Appln. No. PCT/AU2011/000820 filed on Jun. 30, 2011, which claims priority to Australia Patent Application No. 2010902900 filed on Jun. 30, 2010, the disclosures of which are incorporated in their entirety by reference herein.

FIELD OF THE INVENTION

This invention relates generally to a droplet generation system and method. The system and method are of particular utility in the generation of micro-dimensional droplets of an organic or inorganic liquid, especially where the liquid is an aqueous solution. The system is also described herein as a practical source of micro-dimensional droplet streams for thermochemical reactors such as flame spray pyrolysis reactors.

BACKGROUND OF THE INVENTION

There are a variety of reaction systems where a feed component of the reaction is delivered as a fine aerosol mixture of a solution of the component. One such context is flame spray pyrolysis (FSP), in which the fine aerosol mixture is sprayed into the flame area where thermochemical reactions take place. There are a number of devices for producing fine aerosol mixtures, including atomisers, mist makers and two-fluid nozzles. It is typical for these devices to have been optimised for a set of particular working parameters or conditions. As a result, the mean droplet sizes of the aerosol mixture emitted by a given device is more or less a fixed value, depending upon those working parameters or conditions and on the specific design of the device. Moreover, the flow rate of these devices is usually substantially fixed and unable to be altered.

This lack of flexibility and adjustability in the aerosol delivery limits the utility of the reaction systems beyond the bench top or specific tailored applications. An example of a reaction system requiring an aerosol feed is co-pending international patent publication WO 2010/118480 by one of the co-applicants, which discloses a process for depositing nanostructured material onto a particulate substrate. In the preferred method, the nanostructured material is produced by flame spray pyrolysis of an atomised dispersion of micro-dimensional droplets containing a nanophased precursor material.

This process has been proven in principle but there is an opportunity to adapt it to permit low cost commercial production of nanoparticle coatings with tailored properties. A core requirement for such an adaptation is an atomising or droplet generation system able to produce aerosol mixtures of organic or inorganic liquids of variable droplet size, yet narrow droplet size distribution, and variable flow rates. This latter preference arises because different chemical compounds would require different residence times for a complete thermo-chemical reaction.

It is an object of the invention to provide a droplet generation system that at least in part meets this requirement.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

The inventors of the present invention have realised that the aforementioned object can be met by a novel interactive combination of nozzle configurations that are each of a familiar general type. In a simple embodiment, the invention provides an interactive combination of a two-fluid nozzle and a solenoid nozzle with a cyclically operating valve.

The invention accordingly provides, in a first aspect, a droplet generation system, comprising:
  a first nozzle configuration structured to receive a liquid and a gas under pressure in a controllable feed ratio, and to merge the liquid and gas to form an intermediate stream that is a mixture of the gas and of a dispersed phase of the liquid; and
  a second nozzle configuration that is connected to receive the intermediate stream from the first nozzle configuration and has a valve mechanism with one or more controllable operating parameters to emit a stream of droplets of said liquid;
  wherein the mean size of the droplets is dependent on said controllable feed ratio of the liquid and gas and the flow rate of the stream of droplets is dependent on the controllable operating parameter(s) of the valve mechanism.

It will be appreciated that the first nozzle configuration preconditions the fluids that form the intermediate stream into a dispersed phase that facilitates generation of the droplet stream at the second nozzle configuration.

Preferably, the controllable operating parameter of the valve mechanism is its duty cycle, most preferably in particular its frequency of opening and the period for which it is open.

Preferably, the structure of the first nozzle configuration includes a flow restriction at which, or upstream of which, the gas is delivered as a curtain peripherally about the liquid. Advantageously, this structure is provided at an intake end of a housing from which the outlet for the dispersed phase of the liquid formed at the restriction is the second nozzle configuration, disposed at or adjacent the other end of the housing. Preferably, the two nozzle configurations are arranged coaxially with respect to the housing.

The second nozzle configuration may include an outlet orifice and an adjacent valve seat with a complementary valve that, in operation, reciprocates coaxially with respect to the orifice and the valve seat. The valve mechanism is conveniently solenoid actuated.

In a second aspect, the invention provides a method of generating a stream of droplets of a liquid, comprising:
  merging a liquid and gas received under pressure in a controllable full ratio, at a first nozzle configuration to form an intermediate stream that is a mixture of the gas and of the dispersed phase of the liquid, and
  passing the intermediate stream through a valve mechanism with one or more controllable operating parameters to emit a stream of droplets of said liquid
  wherein the mean size of the droplets is dependent on said controllable feed ratio of the liquid and gas and the flow rate of the stream of droplets is dependent on the controllable operating parameter(s) of the valve mechanism.

Preferably, said controllable feed ratio is selected from flow rate, volume rate and density. Typically, said pressure is at least 1.5 Bar for each of the liquid and the gas.

In a third aspect, the invention is directed apparatus for providing nanoparticles comprising, in combination, a droplet generation system according to the first aspect of the invention and a thermochemical reactor, wherein the second nozzle configuration is mounted with respect to the reactor whereby the stream of droplets emitted by the second nozzle configuration is directed into a reaction chamber of the reactor for thermochemical conversion of components of the droplets whereby to produce nanoparticles of a composition determined by the liquid and gas delivered to the first nozzle configuration of the droplet generation system. The thermochemical reactor may conveniently be a flame spray pyrolysis apparatus, in which case the stream of droplets emitted by the second nozzle configuration is directed into the flame region of the flame spray pyrolysis during operation of the apparatus.

In the third aspect of the invention, there is provided a method of providing nanoparticles in which a stream of droplets generated according to the second aspect of the invention is directed into a reaction chamber of a thermochemical reactor for thermochemical conversion of components of the droplets whereby to produce nanoparticles of a composition determined by the liquid and gas received in said merging step.

The thermochemical reaction may be flame spray pyrolysis, wherein the stream of droplets is directed into the flame region of the flame spray pyrolysis. In the third aspect of the invention, the nanoparticles may be in the particle size range 5 to 20 nm. The liquid and gas received in the merging step may be a metal salt in water or water-solvent mixture and gas, whereby the nanoparticles are corresponding metal oxide nanoparticles. The metal salt may, for example, be a metal nitrate, e.g. selected from lithium nitrate, aluminium nitrate, zinc nitrate, iron nitrate, cobalt nitrate, magnesium nitrate, nickel nitrate, silver nitrate or manganese nitrate.

In the methods of the second and third aspects of the invention, the gas may be one or more of air, oxygen, an insert gas such as nitrogen, argon or helium, and a gaseous fuel. Suitable gaseous fuels include carbon monoxide, methane and hydrogen. A gaseous fuel may be preferred, for example, in order to boost the flame in a downstream thermochemical reactor.

In the methods of the second and third aspects of the invention, the liquid may, for example, be water, a water solution, or a water/solvent mix wherein the solvent is miscible with water.

As used herein, except where the context requires otherwise, the term "comprise" and variations of the term, such as "comprising", "comprises" and "comprised", are not intended to exclude further additives, components, integers or steps.

BRIEF DESCRIPTION OF THE DRAWINGS

The invention will now be further described, by way of example only, with reference to the accompanying drawings, in which.

EMBODIMENTS OF THE INVENTION

Figure 1:
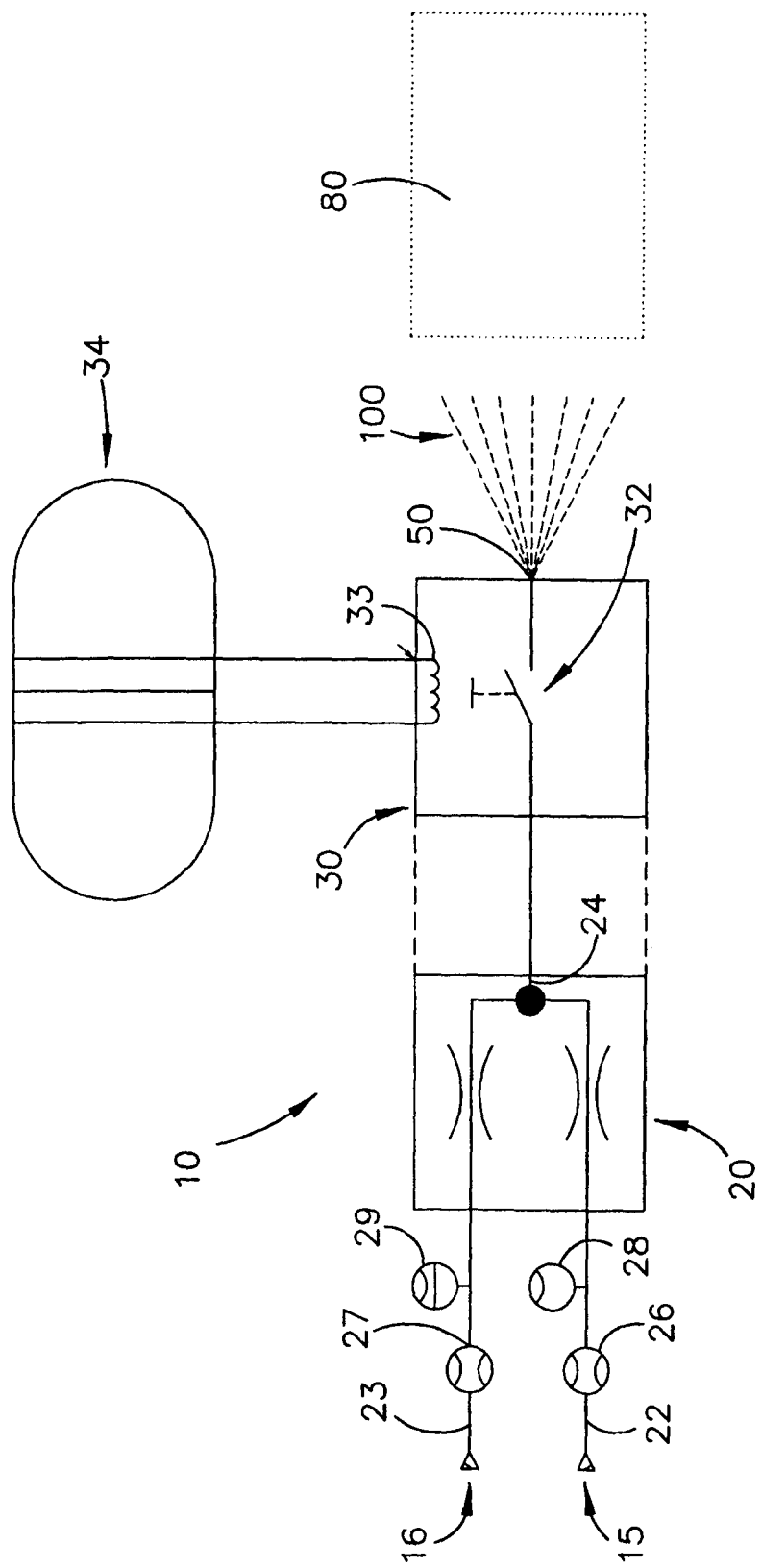
FIG. 1 is a schematic representation of a droplet generation system according to an embodiment the invention, for delivering a stream of micro-dimensional droplets of an aqueous solution of a precursor material to a thermochemical processing reactor.

FIG. 1 is a schematic of the concept of the present invention. The droplet generation system 10 includes a first nozzle configuration 20 and a second nozzle configuration 30. Nozzle configuration 20 has respective inlet passages 22,23 for a liquid 15, e.g. an inorganic or organic solution, and a gas 16, e.g. air, and merges the liquid and gas to form, in a downstream passage 24, an intermediate stream that is a mixture of the gas and of a dispersed phase of the liquid. This intermediate stream is delivered to the second nozzle configuration 30, which has a cyclically operable valve mechanism 32, with one or more controllable operating parameters, to emit a stream 100 of droplets of the liquid input at 22. The liquid and gas inlet passages 22,23 include respective flow controllers 26,27 by which the feed ratio of the fluids (e.g. by flow rate, volume rate, density or otherwise) is controllable. In operation, the fluids are both delivered under pressure, preferably at a minimum of 1.5 bar: the liquid may typically be at 5 bar and the gas at 2 to 4 bar. Respective pressure meters 28,29 are provided for monitoring and control purposes.

Valve mechanism 32 may typically be actuated by a solenoid 33 energised by an electronic control unit 34. This unit produces cycles in the range from 0.5 Hz to 3,000 Hz and a pulse length from 0.2 to 500 milliseconds. A convenient duty cycle for the valve employs a frequency of 100 to 200 Hz and a pulse length of 0.5 to 5 ms, e.g. about 2 ms, to produce droplets of a micro-dimensional mean diameter, say in the range 5 to 100 µm.

Figure 2:
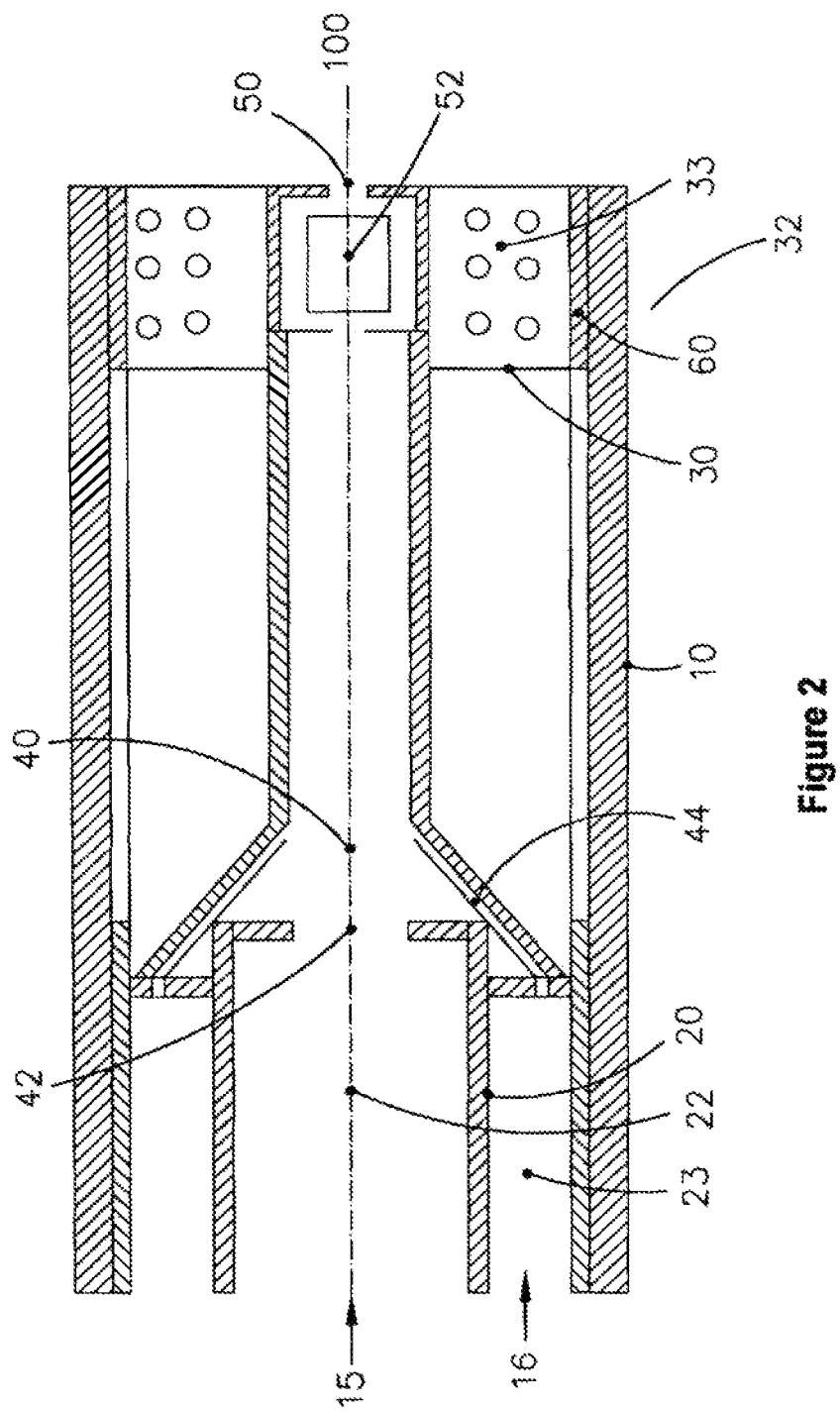
FIG. 2 is an axial cross-section through an embodiment of an assembly of nozzle configurations that form a more specific embodiment of the droplet generation system.

An advantageous construction incorporating the two valve configurations 20,30 into the one housing is depicted in FIG. 2, and comprises a modification of a conventional solenoid valve nozzle. The arrangement comprises an integral cylindrical housing 60 with the nozzle configurations 20,30 respectively defining an inlet of the assembly that includes restriction or orifice 50, and, at the front end, an outlet orifice 50 from which the droplet stream 20 is emitted. Restriction 40 and orifice 50 are co-axial. Orifice 50 has an associated diverging valve seat on its inner face that interacts with a complementary valve 52. Valve 52 is reciprocated axially by the solenoid driver 33, which is disposed within the interior chamber of housing 60 with its coil also arranged coaxially.

Orifice 40 of nozzle configuration 20 is immediately downstream of an axially central outlet 42 of liquid delivery passage 22, about which is an annular outlet 44 from gas delivery passage 23, whereby the gas is delivered as a curtain peripherally about the liquid stream. This arrangement ensures a turbulent mixing of the liquid and gas and the formation downstream through orifice 40 of the intermediate stream that is a mixture of the gas and a dispersed phase of the liquid. Depending on the conditions and the settings, the dispersed phase may be an emulsion or a stream of droplets or a mix of the two. It is this dispersed phase that is divided further downstream into droplet stream 100 by the actions of valve mechanism 32.

An important finding is that, with the illustrated arrangement, the mean diameter of the droplets emitted at orifice 50 is a function of the ratio of the flow rate of the liquid and gas into orifice 40, and that this droplet diameter/size exhibits a relatively narrow distribution range. The mean diameter of the droplets emitted at orifice 50 is also a function of the pressure of the gas, the flow rate of the liquid, and the frequency. Initial tests have demonstrated that the mean droplet size may be varied between around 3 to 5 microns up to 60 to 80 microns, and that the flow rate can be correspondingly controlled by valve mechanism 32 over a range between 0.1 and 1.5 litre per hour or greater, without significantly affecting the droplet dimensions. The half-size bandwidth of the droplet diameter distribution is only about 3 µm at a mean value around 6 µm.

In general, parameters that lead to smaller droplets also reduce the average throughput and vice versa. For example, increasing the pressure of the gas phase decreases the average droplet size; increasing the flowrate of the liquid phase leads to an increase of the average droplet size; increasing the frequency reduces average droplet size; increasing the pulse width widens the range of droplet size distribution.

In summary, the results suggest that increased average velocity of the gas phase leads to smaller droplets. This means that lower droplet sizes are produced at higher frequencies, shorter pulses, higher gas pressures and lower liquid flow-rates.

An advantage of the illustrated arrangement is its success with a wide range of liquids including aqueous solutions. The inventors have found that almost any conventional solenoid valve nozzle arrangement can be optimised to produce fine (micro-dimensional) droplets over a wide range of flow rates where the liquids are organic (benzene, methanol and ethanol), but they were not so effective for aqueous type solutions: where, while the flow rate could be varied widely, it was rather difficult to produce fine droplets of sufficiently small micro-dimensions. It is evident that the initial two-fluid nozzle configuration provides a necessary pre-conditioning of the fluid mixture for presentation to the valved nozzle.

Because of the ability to generate an atomised stream of an aqueous solution at a wide range of flow rates and mean droplet sizes, the system of the invention is suitable for use in flame spray pyrolysis applications such as that described in co-pending international patent publication WO 2010/118480. In that case, the nozzle configuration of FIGS. 1 and 2 is a suitable means for delivering an atomised dispersion containing an active ingredient to the flame of the thermo-chemical reactor 80, as depicted in FIG. 1. In an embodiment, the active ingredient is a nanophased precursor material. This material reacts in the flame, the liquid carrier is evaporated and nanoparticles of the reaction product are deposited on a substrate, which is conveniently a fluidised mass of micro-sized particles of a suitable material such as alumina. A suitable cooling head (not shown) may typically be provided to protect the droplet generation system 10 from the heat of the reactor. By providing the droplets in an appropriate size range, e.g. 3 to 6 micron, the precursor material carried by these droplets reacts in the thermochemical reaction chamber to produce nano-dimensional particles for coating an adjacent substrate.

In one application of the combination, the liquid feed is a metal salt solution in water or water-solvent mixture, and the gas may be an inert gas such as nitrogen, argon or helium, or e.g. where it is desired to boost the flame, a gaseous fuel such as carbon monoxide, methane or hydrogen. For example, an aerosol containing a dispersion of fine droplets (3-6 µm) of zinc chloride (or zinc nitrate) solution sprayed into the flame pyrolysis zone of a gas burner 20 at a temperature in the range 1200 to 2500° C. produces zinc oxide particles of dimensions in the nano range, e.g. in the range 10 to 20 nm. Other suitable metal salts include salts, e.g. nitrates, of lithium, aluminium, iron, cobalt, magnesium, nickel, silver or manganese.

In general, it has been demonstrated that the illustrated droplet generation system can:
produce nanoparticles;
be used to tailor the properties of these nanoparticles for particular applications;
work in a wide rate of parameters;
operate at a greater flowrate (and thus, production rate) than other existing droplet generators.

EXAMPLES

Series 1

The assembly of FIG. 2 was employed to conduct a series of experiments to ascertain the influences of process parameters on droplet size generation. Each run was for 5 minutes and snapshots of average droplet size (and distribution) were provided by a Malvern Spraytec2000 instrument.

Example 1

| Gas Phase | Flowrate | 3 litres per minute |
| --- | --- | --- |
| | Pressure | Varied in successive runs to be successively 3, 4, 5, 6, 7 and 7.5 Bar |
| Liquid Phase | Flowrate | 10 ml per minute |
| | Pressure | 10 Bar |
| Value | Frequency | 150 Hz |
| | Pulse Width | 2 ms |

Figure 3:
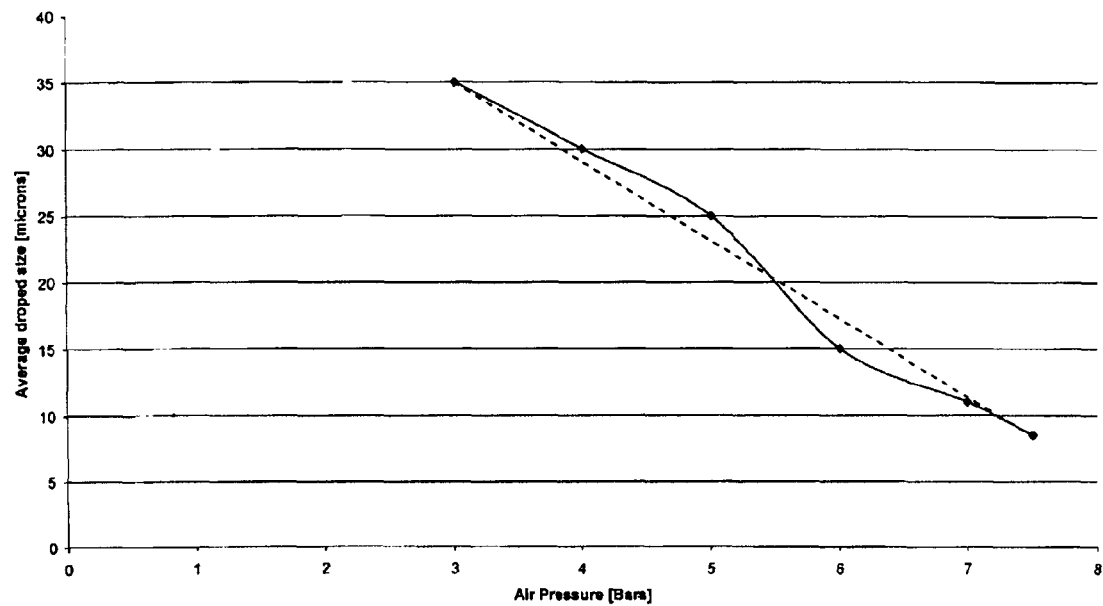
FIGS. 3 to 7 are graphical representations of the results of Examples 1 to 5 respectively.

The results are shown graphically in FIG. 3.

It was concluded that increasing the pressure of the gas phase leads to a steady, almost linear, decrease in the average droplet size.

Example 2

| Gas Phase | Flowrate | 3 litres per minute |
| --- | --- | --- |
| | Pressure | 7 Bar |
| Liquid Phase | Flowrate | Varied in successive runs to be successively 5, 10, 15, 20, 25, 30 ml per minute. |
| | Pressure | 10 Bar |
| Value | Frequency | 150 Hz |
| | Pulse Width | 2 ms |

Figure 4:
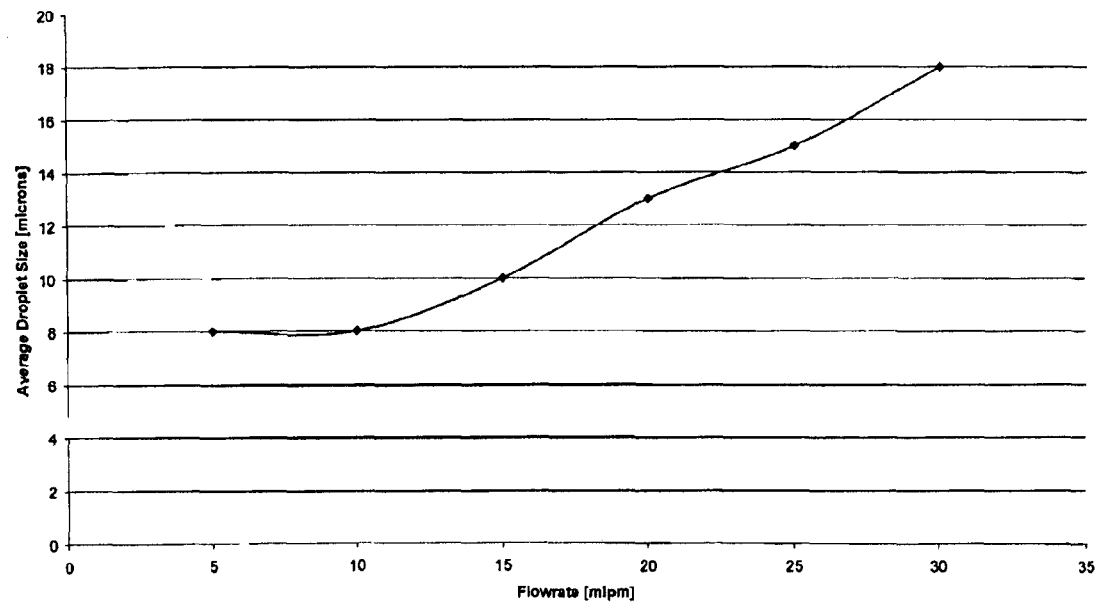

The results are shown graphically in FIG. 4.

It was concluded that increasing the flowrate of the liquid phase leads to a steady, almost linear, increase in the average droplet size.

Example 3

| Gas Phase | Flowrate | 3 litres per minute |
| --- | --- | --- |
| | Pressure | 7 Bar |
| Liquid Phase | Flowrate | 10 ml per minute. |
| | Pressure | 10 Bar |
| Value | Frequency | Varied in successive runs to be successively 50, 75, 100, 125, 150, 175, 200 Hz. |
| | Pulse Width | 2 ms |

Figure 5:
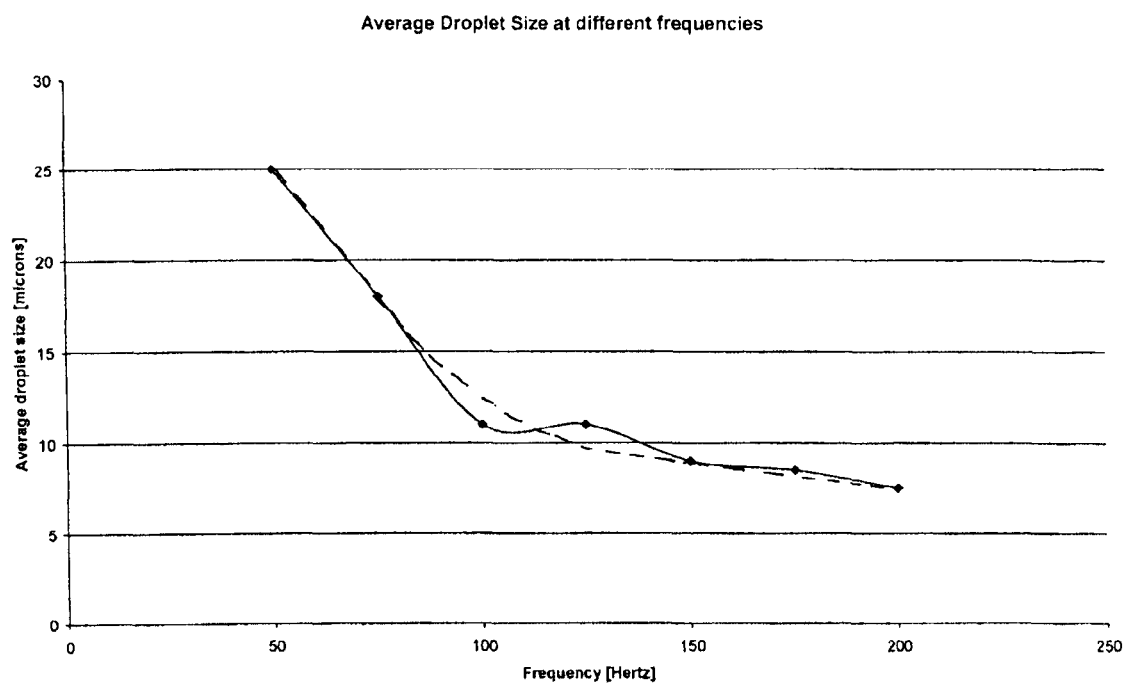

The results are shown graphically in FIG. 5.

It was concluded that increasing the frequency leads to a steady decrease in the average droplet size, a greater influence at the lower frequency range (50-100 Hz) than at the higher frequency range (100-200 Hz)

Example 4

| Gas Phase | Flowrate | 3 litres per minute |
|---|---|---|
| | Pressure | 7 Bar |
| Liquid Phase | Flowrate | 10 ml per minute. |
| | Pressure | 10 Bar |
| Value | Frequency | 100 Hz. |
| | Pulse Width | Varied in successive runs to be successively 1.5, 2.0, 2.5, 3.0, 4.0, 5.0 ms. |

Figure 6:
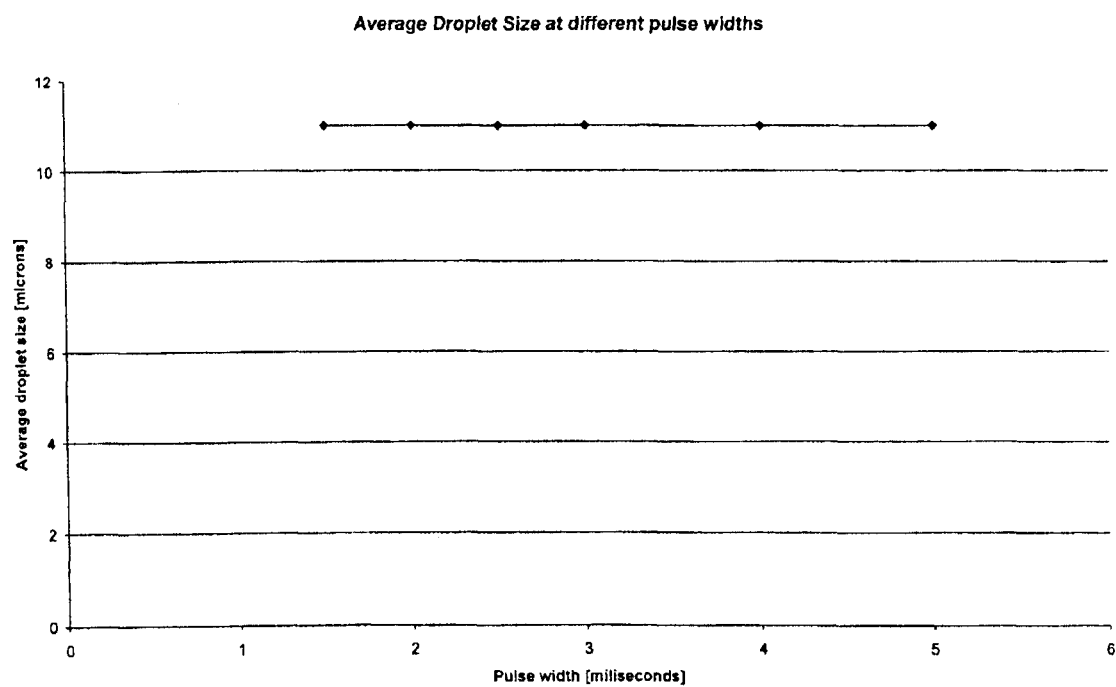

The results are shown graphically in FIG. 6.

It was concluded that increasing the pulse width leads does not affect the average droplet size within the range studied (1.5-5 ms). However, the snapshots demonstrate that the bell curve widens slightly at higher pulse widths (at 5 ms (50% duty cycle) the droplet size ranges from 1 to 100 microns).

Example 5

A comparative example was now set up to compare an optimised set of process parameters based on the results of Examples 1-4 with original random "normal" reference conditions.

| | | Normal or Reference Conditions | Optimised Conditions |
|---|---|---|---|
| Gas Phase | Flowrate | 3 litres per minute | 3 litres per minute |
| | Pressure | 3 Bar | 7 Bar |
| Liquid Phase | Flowrate | 10 ml per minute. | 10 ml per minute |
| | Pressure | 10 Bar | 10 Bar |
| Value | Frequency | 150 Hz. | 175 Hz |
| | Pulse Width | 2 ms. | 1.5 ms |

Figure 7:
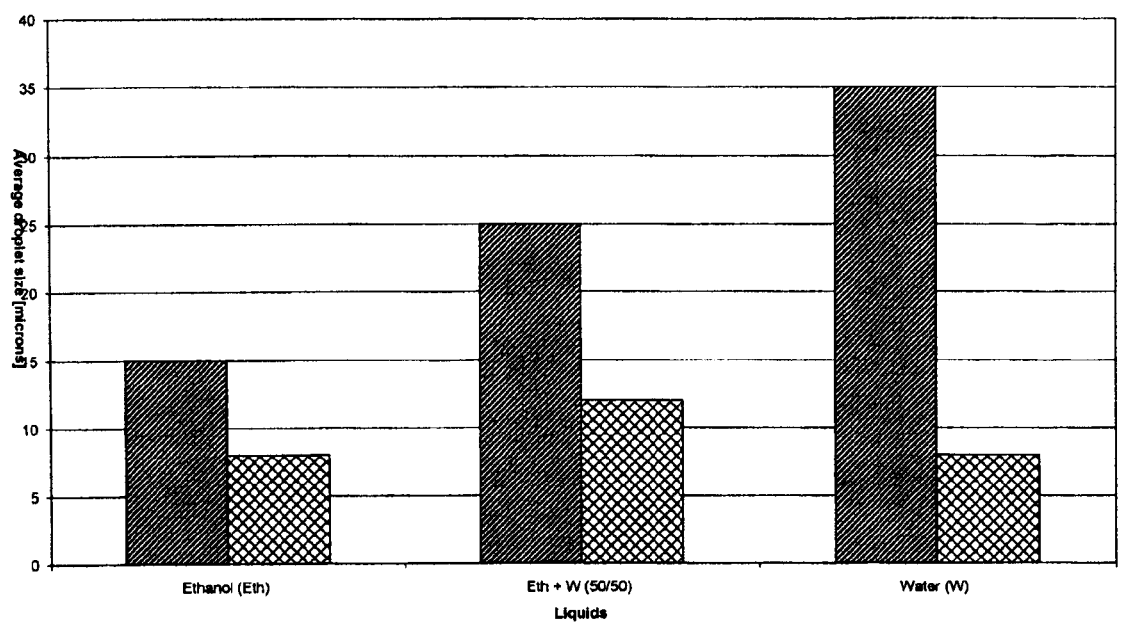

The results are shown graphically in FIG. 7.

It was concluded that optimized running conditions allow fine droplets of ethanol, water and their mixtures to be produced with almost the same average size of 8-12 microns. Further refinement of droplet sizes is possible under conditions optimized for a particular pair of gas-liquid phases (e.g. air-water, argon-ethanol, etc.)

Series 2

The assembly of FIG. 2 was employed to deliver a stream of droplets to a thermochemical reactor of the kind disclosed in International patent publication WO 2010/118480.

The purpose was to verify the possibility of synthesizing nano-scale particles using the droplet generator when combined with a burner ("hot runs"). The results are characterized by phase transformation (determined by XRD), surface area (determined by BET) and average particle size (determined by TEM).

The initial approach taken was to produce ZnO nanoparticles from a 0.1 molar water solution of zinc nitrate and use it as a baseline against a conventional setup, i.e. an atomizer with 0.08 mlpm flowrate and argon as carrier gas. The first results demonstrated that the amount of heat energy delivered from the existing burner was very limited and not high enough to create the thermo-chemical reaction needed at higher rates resulting in lengthy experiments. Since time was of primary essence and keeping experiments short was vitally important, a new approach was taken—i.e. ethanol was used instead of water for making the precursor which also worked as a fuel.

The experimental campaign was organized in the following groups:

1. Water solution—five molar concentrations: 1.0, 0.5, 0.1, 0.05, 0.01.
2. Ethanol solution—five molar concentrations: 1.0, 0.5, 0.1, 0.05, 0.01.
   (It was expected that 1 molar would deliver highest production rate while 0.01 molar on the other end of the scale would result in smallest particle size)
3. Water solution—four different flowrates—5.0 10.0, 15.0, 20.0 mlpm—to investigate the influence of this parameter on particle size and production rate.
4. Ethanol solution—four different flowrates—5.0 10.0, 15.0, 20.0 mlpm—to investigate the influence of this parameter on particle size and production rate.
5. 1 molar concentration—three different solutions (ethanol, ethanol and water, water).

20 hot runs were produced in total. Average time per run was between 10 and 30 min depending on the particular conditions.

It is well expected that, as conditions were varied to target different boundary conditions, there would be samples with high and low production rate, smaller and larger particle sizes, greater or worse uniformity, etc.

As BET requires relatively large amount of powder for running the analyses, the 5 samples with highest production rates were selected to be initially analysed.

The running conditions of these samples were as follow:
51—10 mlpm flowrate; 0.1 molar eth+w (50/50 vol %),
43—10 mlpm flowrate; 0.1 molar ethanol.
44—15 mlpm flowrate; 0.1 molar ethanol,
49—10 mlpm flowrate; 0.5 molar ethanol,
50—10 mlpm flowrate; 1.0 molar ethanol, The XRD results clearly demonstrated that all samples had undergone complete transformation and were fully converted into ZnO.

Other speculations can be made here based on the peak intensities and their FWHM (full width at half maxima). It was not hard to see that sample #50 produced the highest peak intensities and had the most narrow peaks, meaning that one should expect that this sample would have the largest particles of all. It did have also the highest production rate of all samples—nearly 0.5 gram of powder was collected after 10 min run which makes it about 100 times greater than the atomizer. On the other end of the scale, sample #43 demonstrated lowest peak intensity and widest FWHM, suggesting that the lower molar concentration and moderate flowrates result in much finer structure. The most encouraging result was probably sample #51—produced with 50/50 (eth+w) solution. It delivered high production rate (about 80% of the sample run with pure ethanol) and used only half of the ethanol required as a fuel. Peak intensities and FWFM also suggested that particle sizes of this sample are finer than those of sample #50.

The TEM results demonstrated the fact that the average particle size in all cases remained relatively small—in the range of 10-30 nm. In the majority of cases the average particle size was in the range of 10-15 nm. A preferred range in which the nanoparticles predominantly lie is 5 to 20 nm. Most homogeneous in shape and size were samples #43 and #51, which is a very promising result confirming that under particular conditions, fine grained powders can be produced from low and high molar concentrations (10 fold greater) of the precursor.

There were differences in sizes and morphology which confirmed that different running conditions would influence the final product, meaning that materials with tailored properties could be produced using the device.

It was noted that samples #44, #49 and #50 resulted in chain formations, or needle type structures and samples #43 and #51 did not demonstrate this. This phenomenon is most likely due to the combination of higher molar concentration and using ethanol as a solvent.

In general, the TEM results thoroughly confirmed the speculations made based on the XRD results alone.

Based on the information provided, with 10 mlpm flowrate of ethanol solution of one molar concentration of zinc nitrate, this assembly delivers about 100 times greater throughput compared to the standard setup and usage of the existing atomizer. However, the theoretical throughput of this current design is more than 50 litres/hour. It is greater than the 600 ml/h (10 mlpm) currently used for the majority of the experiments. This would suggest that if superior experimental conditions are provided, the production rate could be increased significantly. It might be expected that for the majority of the compounds that would satisfy this thermo-chemical reaction type (i.e. metal nitride+heat=metal oxide) ethanol can used for the precursor, either in pure form, or diluted with water at particular ratio. The examples demonstrate that the assembly is highly versatile with the potential for a wider range of applications.

The invention claimed is:

1. A droplet generation system, comprising:
   a first nozzle configuration structured to receive a liquid and a gas under pressure in a controllable feed ratio, and to merge the liquid and gas to form an intermediate stream that is a mixture of the gas and of a dispersed phase of the liquid; and
   a second nozzle configuration that is connected to receive the intermediate stream from the first nozzle configuration and has a valve mechanism with one or more controllable operating parameters to emit a flowing stream of droplets of said liquid;
   wherein the mean size of the droplets is dependent on said controllable feed ratio of the liquid and gas and the flow rate of the stream of droplets is dependent on the controllable operating parameter(s) of the valve mechanism.

2. The system according to claim 1 wherein the controllable operating parameter of the valve mechanism is the duty cycle of the valve mechanism.

3. The system according to claim 2 wherein the controllable operating parameter of the valve mechanism is the valve mechanism's frequency of opening and the period for which the valve mechanism is open.

4. The system according to claim 2 wherein the first nozzle configuration includes a flow restriction at which, or upstream of which, the gas is delivered as a curtain peripherally about the liquid.

5. The system according to claim 4 wherein said flow restriction is provided at a first, intake end of a housing from which the outlet for the dispersed phase of the liquid formed at the restriction is the second nozzle configuration, disposed at or adjacent a second end of the housing.

6. The system according to claim 5 wherein the first and second nozzle configurations are arranged coaxially with respect to the housing.

7. The system according to claim 6 wherein the second nozzle configuration includes an outlet orifice and an adjacent valve seat with a complementary valve that, in operation, reciprocates coaxially with respect to the orifice and the valve seat.

8. The system according to claim 1 wherein said controllable feed ratio is selected from the group consisting of flow rate, volume rate and density.

9. The system according to claim 1 wherein said pressure is at least 1.5 Bar for each of the liquid and the gas.

10. An apparatus for providing nanoparticles comprising, in combination, a droplet generation system according to claim 1 and a thermochemical reactor, wherein the second nozzle configuration is mounted with respect to the reactor whereby the stream of droplets emitted by the second nozzle configuration is directed into a reaction chamber of the reactor for thermochemical conversion of components of the droplets producing nanoparticles of a composition determined by the liquid and gas delivered to the first nozzle configuration of the droplet generation system.

11. The apparatus according to claim 10 wherein the thermochemical reactor is a flame spray pyrolysis apparatus, and the stream of droplets emitted by the second nozzle configuration is directed into the flame region of the flame spray pyrolysis apparatus during operation of the apparatus.

12. A method of generating a stream of droplets of a liquid, comprising:
    merging a liquid and gas received under pressure in a controllable feed ratio, at a first nozzle configuration to form an intermediate stream that is a mixture of the gas and of a dispersed phase of the liquid, and
    passing the intermediate stream through a valve mechanism with one or more controllable operating parameters to emit a flowing stream of droplets of said liquid,
    wherein the mean size of the droplets is dependent on said controllable feed ratio of the liquid and gas and the flow rate of the stream of droplets is dependent on the controllable operating parameter(s) of the valve mechanism.

13. The method according to claim 12 wherein the controllable operating parameter of the valve mechanism is the duty cycle of the valve mechanism.

14. The method according to claim 13 wherein the controllable operating parameter of the valve mechanism is the valve mechanism's frequency of opening and the period for which the mechanism is open.

15. The method according to claim 13 wherein said controllable feed ratio is selected from the group consisting of flow rate, volume rate and density.

16. The method according to claim 12 wherein said pressure is at least 1.5 Bar for each of the liquid and the gas.

17. A method of providing nanoparticles in which a stream of droplets generated according to claim 12 is directed into a reaction chamber of a thermochemical reactor for thermochemical conversion of components of the droplets to produce nanoparticles of a composition determined by the liquid and gas received in said merging step.

18. The method according to claim 17 comprising flow spray pyrolysis, wherein the stream of droplets is directed into the flame region of the flame spray pyrolysis.

19. The method according to claim 17 wherein the liquid and gas received in said merging step are respectively a solution of a metal salt in water or water-solvent mixture and gas, whereby the nanoparticles produced are corresponding metal oxide nanoparticles.

20. The method according to claim 17 wherein the liquid and gas received in said merging step are respectively (i) a solution of a metal nitrate selected from lithium nitrate, aluminium nitrate, zinc nitrate, iron nitrate, cobalt nitrate, magnesium nitrate, nickel nitrate, silver nitrate or manganese nitrate in water or water-solvent mixture and (ii) gas, whereby the nanoparticles produced are corresponding metal oxide nanoparticles.

21. The method according to claim 19 wherein the gas is an inert gas.

22. The method according to claim 17 wherein the nanoparticles produced are in the particle size range 5 to 20 nm.

23. The system according to claim 1 wherein the first nozzle configuration includes a flow restriction at which, or upstream of which, the gas is delivered as a curtain peripherally about the liquid.

24. The system according to claim 23 wherein said flow restriction is provided at a first, intake end of a housing from which the outlet for the dispersed phase of the liquid formed at the restriction is the second nozzle configuration, disposed at or adjacent a second end of the housing.

25. The system according to claim 24 wherein the first and second nozzle configurations are arranged coaxially with respect to the housing.

26. The system according to claim 1 wherein the second nozzle configuration includes an outlet orifice and an adjacent valve seat with a complementary valve that, in operation, reciprocates coaxially with respect to the orifice and the valve seat.

27. The system according to claim 4 wherein the second nozzle configuration includes an outlet orifice and an adjacent valve seat with a complementary valve that, in operation, reciprocates coaxially with respect to the orifice and the valve seat.

28. The system according to claim 3 wherein the first nozzle configuration includes a flow restriction at which, or upstream of which, the gas is delivered as a curtain peripherally about the liquid.

29. The system according to claim 1 wherein the second nozzle configuration includes an outlet orifice and an adjacent valve seat with a complementary valve that, in operation, reciprocates coaxially with respect to the orifice and the valve seat.

30. The method according to claim 20 wherein the gas is an inert gas.

* * * * *

UNITED STATES PATENT AND TRADEMARK OFFICE
CERTIFICATE OF CORRECTION

PATENT NO. : 8,967,492 B2  
APPLICATION NO. : 13/807506  
DATED : March 3, 2015  
INVENTOR(S) : Jonian Nikolov et al.

Page 1 of 1

It is certified that error appears in the above-identified patent and that said Letters Patent is hereby corrected as shown below:

On the Title Page after (73) Assignee: COMMONWEALTH SCIENTIFIC AND INDUSTRIAL RESEARCH ORGANISATION (AU) Insert -- KOREA INSTITUTE OF GEOSCIENCE AND MINERAL RESOURCES (KR) --

Signed and Sealed this  
Fourteenth Day of July, 2015

Michelle K. Lee  
*Director of the United States Patent and Trademark Office*